United States Patent
Tischler (10) Patent No.: US 10,502,335 B2
(45) Date of Patent: Dec. 10, 2019

(54) POSITIVE RETRACTION BYPASS VALVE SYSTEM AND METHOD

(71) Applicant: HYDRABLAST TECHNOLOGIES, INC., Houston, TX (US)

(72) Inventor: Dieter A. Tischler, Houston, TX (US)

(73) Assignee: HYDRABLAST TECHNOLOGIES, INC., Houston, TX (US)

(*) Notice: Subject to any disclaimer, the term of this patent is extended or adjusted under 35 U.S.C. 154(b) by 178 days.

(21) Appl. No.: 15/647,057

(22) Filed: Jul. 11, 2017

(65) Prior Publication Data

US 2019/0017615 A1    Jan. 17, 2019

(51) Int. Cl.
*F16K 17/06* (2006.01)
*F16K 17/04* (2006.01)

(52) U.S. Cl.
CPC ............ *F16K 17/06* (2013.01); *F16K 17/048* (2013.01)

(58) Field of Classification Search
CPC .......... F16K 17/06; F16K 1/48; F16K 17/048; F16K 31/60; F16K 31/50; F16K 1/02; F16K 1/485; F04B 7/0057
USPC ................. 251/319–321, 229, 122, 121, 264
See application file for complete search history.

(56) References Cited

U.S. PATENT DOCUMENTS

| | | | | |
|---|---|---|---|---|
| 4,064,908 A * | 12/1977 | Loe | ........................... | F16K 1/38 137/614.17 |
| 4,543,987 A * | 10/1985 | Ekeleme, Jr. | ....... | F16K 17/0413 137/522 |
| 4,590,969 A * | 5/1986 | Sirois | ...................... | F16K 31/44 137/613 |
| 4,726,395 A * | 2/1988 | Howes | ...................... | F16K 1/32 137/469 |
| 4,768,929 A * | 9/1988 | Geberth, Jr. | ............ | F04B 49/24 210/133 |
| 4,823,835 A * | 4/1989 | Chu | .................... | F16K 27/0281 137/557 |
| 4,932,434 A * | 6/1990 | Taylor | ..................... | F16K 17/06 137/469 |
| 6,612,538 B2 * | 9/2003 | Fukano | ..................... | F16K 7/17 251/63.5 |
| 9,879,792 B1 * | 1/2018 | Wyatt | ..................... | F17C 13/04 |
| 2009/0020171 A1 * | 1/2009 | Benstead | .................. | F16K 3/08 137/540 |
| 2014/0103240 A1 * | 4/2014 | Glime, III | ............. | F16K 31/506 251/265 |
| 2015/0000761 A1 * | 1/2015 | Jefferies | .................. | E21B 34/08 137/15.08 |
| 2015/0059884 A1 * | 3/2015 | Grenaway | ........... | F16K 27/0281 137/538 |

* cited by examiner

*Primary Examiner* — Jessica Cahill
(74) *Attorney, Agent, or Firm* — Jackson Walker, LLP (57) ABSTRACT

The present disclosure provides a system and associated method for a positive retraction bypass valve. The positive retraction bypass valve can include a dump cartridge in a valve body with a valve stem biased to an open position to allow flow through a drain path. An adjuster can advance toward the valve stem and oppose the bias to at least partially close the valve. Upon retraction of the adjuster from the valve body, a retraction rod assembly with a retraction rod coupled to the adjuster and the valve stem can pull the valve stem toward the adjuster if the bias or fluid pressure on the valve stem does not move the valve stem toward the adjuster.

10 Claims, 5 Drawing Sheets

FIG. 8

POSITIVE RETRACTION BYPASS VALVE SYSTEM AND METHOD

CROSS REFERENCE TO RELATED APPLICATIONS

Not applicable.

STATEMENT REGARDING FEDERALLY SPONSORED RESEARCH OR DEVELOPMENT

Not applicable.

REFERENCE TO APPENDIX

Not applicable.

BACKGROUND OF THE INVENTION

Field of the Invention

The disclosure generally relates to high pressure fluid pumping systems and methods. More specifically, the disclosure relates to systems and methods of controlling fluid flow in high pressure fluid pumping systems.

Description of the Related Art

High-pressure water blasting pump units typically operate in the range of 4,000 to 55,000 psi. The pumps on these units are typically of the positive displacement type. During normal operation, pump output is directed to any of a wide variety of tools that produce water jets, and these water jets, when directed at a work piece or work surface, perform cleaning and/or cutting actions depending on the pressure or tool employed.

During normal operation, there is often a need to bypass water flowing from the pump, so that an operator can adjust pressure, perform a controlled pressure increase or decrease, reposition equipment to a new location, or any of a number of related reasons. The name normally associated with the assembly of valve components that perform the bypass function is the "bypass valve" or "pressure regulating valve."

Figure 1:
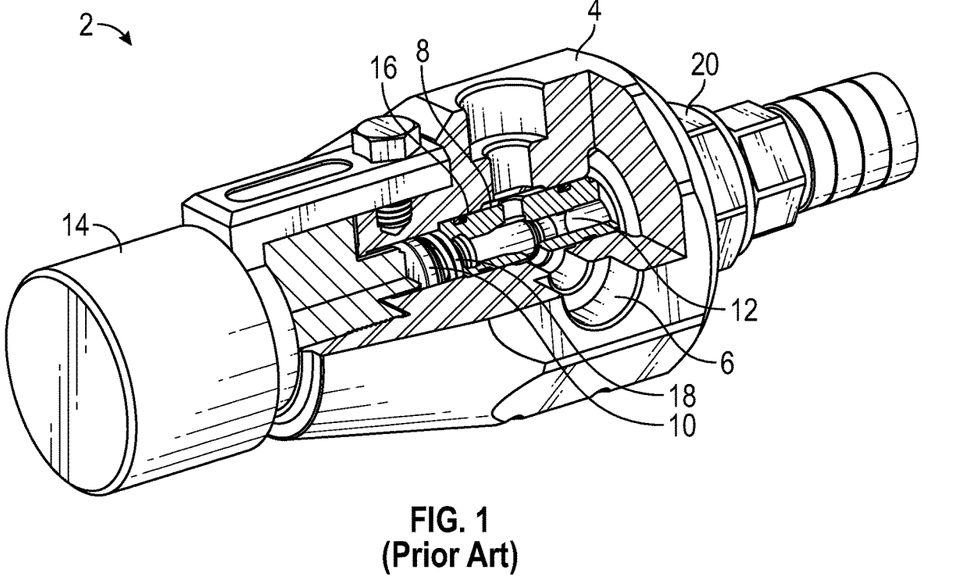
FIG. 1 is a schematic partial cross sectional perspective front view of a typical bypass valve in a closed bypass state.
Figure 2:
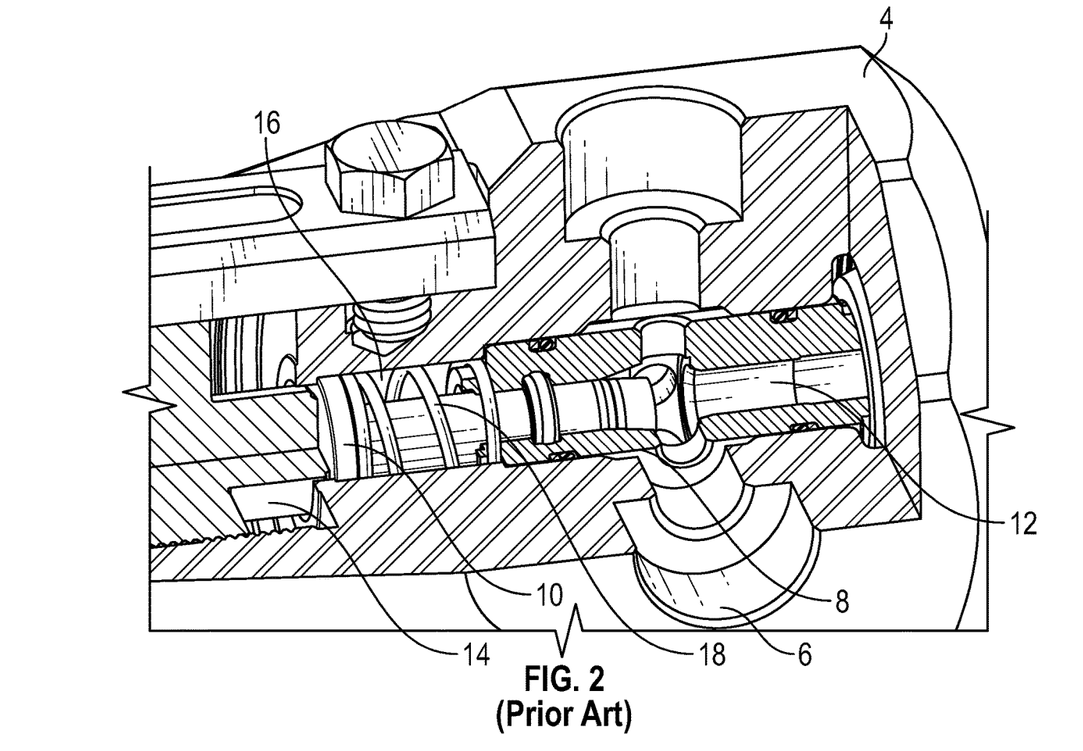
FIG. 2 is an enlarged schematic partial cross sectional perspective front view of the typical valve of FIG. 1 in an open bypass state.

FIG. 1 is a schematic partial cross sectional perspective front view of a typical bypass valve in a closed bypass state. FIG. 2 is an enlarged schematic partial cross sectional perspective front view of the typical valve of FIG. 1 in an open bypass state. The bypass valve 2 has a main valve body 4 with at least one inlet/outlet port 6 (typically three ports). The valve body 4 is formed with a valve body cavity 16 in which a dump cartridge 8 is slidably coupled to the valve body. The dump cartridge 8 includes a valve stem 10 that is spring-loaded by a compression spring 18 to an open position shown in FIG. 2 that allows high-pressure fluid from the pump to drain out of the valve through a drain port 12 and through a fitting 20.

An adjuster 14 is attached to the valve body 4, such as a rotatable handle that is threadably attached, and can be advanced in the valve body 4 toward the valve stem 10 to adjust the valve stem progressively to a closed position and anywhere therebetween by pushing against the bias of the spring-loaded valve stem. For example and without limitation, a total travel distance of the adjuster and the valve stem from fully open to fully closed is approximately one-half inch (13 mm). The adjustment can throttle the amount of high pressure fluid that flows out of the drain port 12, which affects the amount of fluid that flows out of the inlet/outlet port 6. When the dump cartridge 8 is completely closed by the adjuster action on the valve stem 10, as shown by the position of the valve stem in FIG. 1, there is no fluid flow to the drain port and the system is at maximum pressure and flow rate to the tool(s). The fluid flow produced by the pump can be discharged through the one or more inlet/outlet ports 6.

When the adjuster 14 is retracted, the valve stem 10 in the dump cartridge 8 reopens the drain port 12 by either the bias of the compression spring 18 in the dump cartridge 8 pushing the valve stem 10 back out toward the adjuster 14, or by the direct action of high-pressure water in the dump cartridge pushing the valve stem against the adjuster. There is not an intimate or mechanical connection between the adjuster 14 and the valve stem 10 to retract the valve.

Most of the time, the adjuster 14 can be advanced or retracted according to the flow needs, but there is typically an uncertainty about whether the valve stem 10 is staying in contact with the adjuster during retraction. For example, situations arise from time-to-time when the valve stem 10 in the dump cartridge sticks in a closed position (i.e., no flow to the drain port) after having been advanced fully by the adjuster. When the adjuster 14 is retracted to open up the valve stem and lower the pressure, the valve stem 10 is not able to return to a default position toward the adjuster 14 that normally would occur by the compression spring bias on the valve stem. When the valve stem sticks in place in the closed position, the adjuster 14 can still be retracted, but the valve stem 10 does not follow the adjuster even though biased to do so and does not open as intended. Because there is no visibility into the valve, the operator is left to assume the drain port has been opened, for example, when the adjustment is made when the pump is off.

If the valve stem 10 is stuck in the closed position, the flow cannot go to the drain port 12, even though the adjuster 14 has been retracted. The system can start up and build pressure immediately with no drain (that is, no bypass). All of the pump flow will go to the inlet/outlet ports 6 and thence to tools and other connected machinery without the operator being warned or prepared for operation of the tool or machinery. This lack of a positive action to retract the valve stem in the dump cartridge can present a significant safety issue across many applications and many industries. While the compression spring 18 could be strengthened to perhaps overcome a sticking valve stem, the additional spring strength causes an extra load on turning the adjuster 14 to advance against the spring and there still remains an uncertainty of the valve stem position without a positive retraction.

Therefore, there remains a need for an improved valve system to assist the valve stem in the bypass valve to be positioned as intended in the valve after being released to return to a default position to reduce safety issues caused by improper positioning.

BRIEF SUMMARY OF THE INVENTION

The present disclosure provides a system and associated method for a positive retraction bypass valve. The positive retraction bypass valve can include a dump cartridge in a valve body with a valve stem biased to an open position to allow flow through a drain path. An adjuster can advance toward the valve stem and oppose the bias to at least partially close the valve. Upon retraction of the adjuster from the valve body, a retraction rod assembly with a retraction rod coupled to the adjuster and the valve stem can pull the valve stem toward the adjuster if the bias or fluid pressure on the valve stem does not move the valve stem toward the adjuster.

The disclosure provides a positive retraction bypass valve, comprising: a valve body having a proximal end and a distal end and having a flow path, a drain path, and a valve body cavity formed in the valve body and fluidicly coupled to the flow path and the drain path; a dump cartridge having a slidable valve stem, the dump cartridge being disposed in the valve body cavity; a bias member configured to bias the slidable valve stem in the dump cartridge to allow flow through the drain path; an adjuster adjustably coupled to the valve body and configured to push the valve stem toward a closed position to progressively restrict flow through the drain path; and a retraction rod releasably coupled to the adjuster on a proximal portion of the rod, the valve stem on a distal portion of the rod, or a combination thereof, the rod being configured to pull the valve stem toward the adjuster if the valve stem does not follow the position of the adjuster when the adjuster is moved in the direction away from the valve stem.

The disclosure also provides a method of operating a bypass valve, the bypass valve formed with a flow path and a drain path, and having a valve body with a dump cartridge disposed therein, the dump cartridge having a valve stem that is biased with a bias member, and an adjuster coupled to the valve body with a retraction rod coupled between the adjuster and the valve stem, the method comprising: adjusting a fluid flow through the flow path of the valve by moving a position of the adjuster in a direction toward the valve stem to change a flow through the drain path; moving the adjuster in a direction away from the valve stem; allowing the valve stem to follow the position of the adjuster by a bias of the bias member when the adjuster is moved in the direction away from the valve stem; and pulling the valve stem with the retraction rod, if the valve stem does not follow the position of the adjuster (by the bias of the bias member or by fluid pressure in the dump cartridge on the valve stem) when the adjuster is moved in the direction away from the valve stem.

DETAILED DESCRIPTION

The Figures described above and the written description of specific structures and functions below are not presented to limit the scope of what Applicant has invented or the scope of the appended claims. Rather, the Figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present disclosure will require numerous implementation-specific decisions to achieve the developer's ultimate goal for the commercial embodiment. Such implementation-specific decisions may include, and likely are not limited to, compliance with system-related, business-related, government-related, and other constraints, which may vary by specific implementation or location, or with time. While a developer's efforts might be complex and time-consuming in an absolute sense, such efforts would be, nevertheless, a routine undertaking for those of ordinary skill in this art having benefit of this disclosure. It must be understood that the inventions disclosed and taught herein are susceptible to numerous and various modifications and alternative forms. The use of a singular term, such as, but not limited to, "a," is not intended as limiting of the number of items. Further, the various methods and embodiments of the system can be included in combination with each other to produce variations of the disclosed methods and embodiments. Discussion of singular elements can include plural elements and vice-versa. References to at least one item may include one or more items. Also, various aspects of the embodiments could be used in conjunction with each other to accomplish the understood goals of the disclosure. Unless the context requires otherwise, the term "comprise" or variations such as "comprises" or "comprising," should be understood to imply the inclusion of at least the stated element or step or group of elements or steps or equivalents thereof, and not the exclusion of a greater numerical quantity or any other element or step or group of elements or steps or equivalents thereof. The device or system may be used in a number of directions and orientations. The terms such as "coupled", "coupling", "coupler", and like are used broadly herein and may include any method or device for securing, binding, bonding, fastening, attaching, joining, inserting therein, forming thereon or therein, communicating, or otherwise associating, for example, mechanically, magnetically, electrically, chemically, operably, directly or indirectly with intermediate elements, one or more pieces of members together and may further include without limitation integrally forming one functional member with another in a unity fashion. The coupling may occur in any direction, including rotationally. The order of steps can occur in a variety of sequences unless otherwise specifically limited. The various steps described herein can be combined with other steps, interlineated with the stated steps, and/or split into multiple steps. Some elements are nominated by a device name for simplicity and would be understood to include a system or a section or related components, such as seals, washers, fasteners, and the like that are known to those with ordinary skill in the art and may not be specifically described. Similarly, elements have been described functionally and can be embodied as separate components or can be combined into components having multiple functions.

The present disclosure provides a system and associated method for a positive retraction bypass valve. The positive retraction bypass valve can include a dump cartridge in a valve body with a valve stem biased to an open position to allow flow through a drain path. An adjuster can advance toward the valve stem and oppose the bias to at least partially close the valve. Upon retraction of the adjuster from the valve body, a retraction rod assembly with a retraction rod coupled to the adjuster and the valve stem can pull the valve stem toward the adjuster if the bias or fluid pressure on the valve stem does not move the valve stem toward the adjuster.

Figure 3:
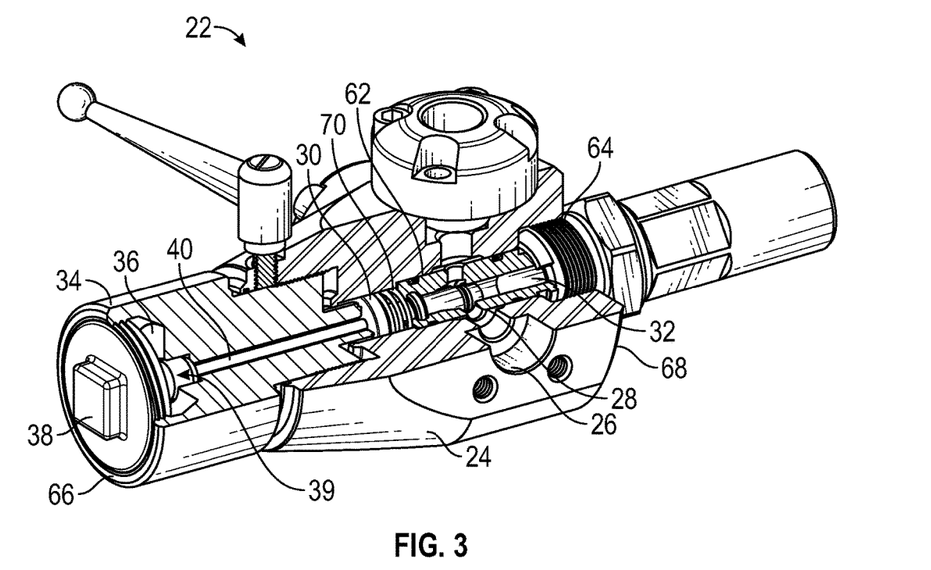
FIG. 3 is a schematic partial cross sectional perspective front view of an exemplary bypass valve of the present invention.
Figure 4:
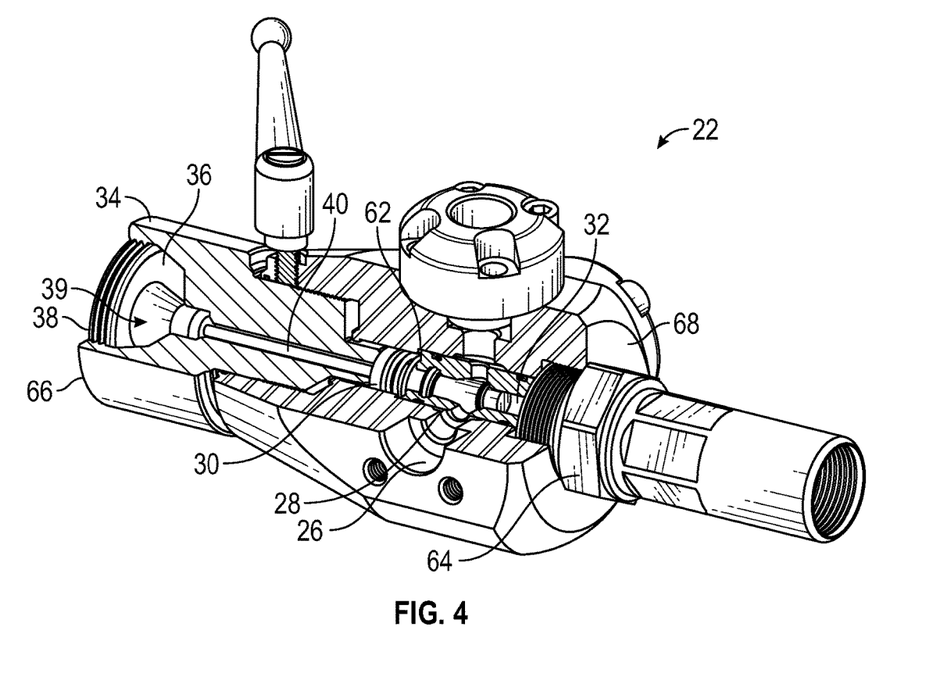
FIG. 4 is a schematic partial cross sectional perspective rear view of the exemplary bypass valve of FIG. 3.
Figure 5:
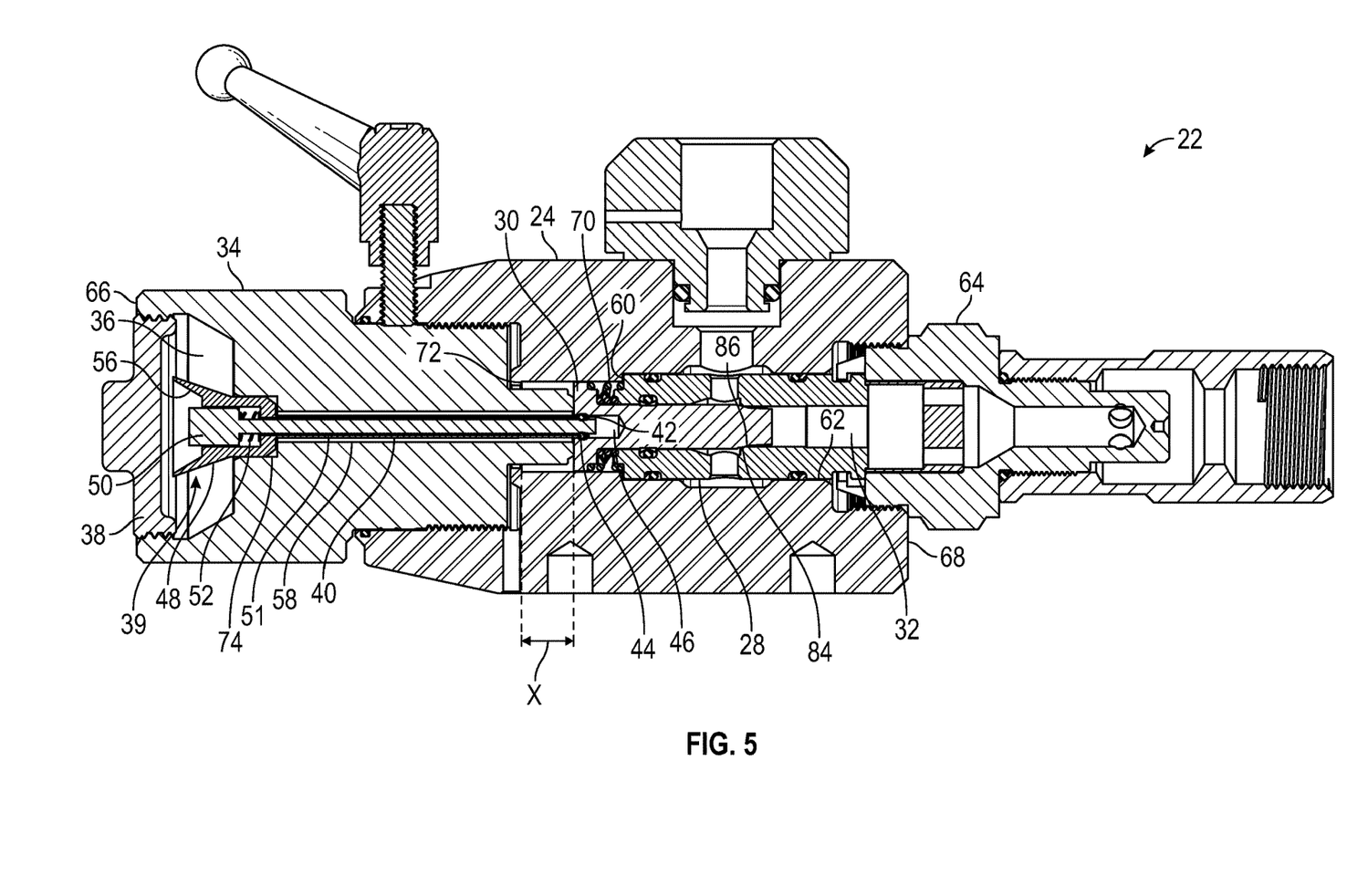
FIG. 5 is a schematic cross sectional side view of the exemplary bypass valve shown in FIG. 3.
Figure 6:
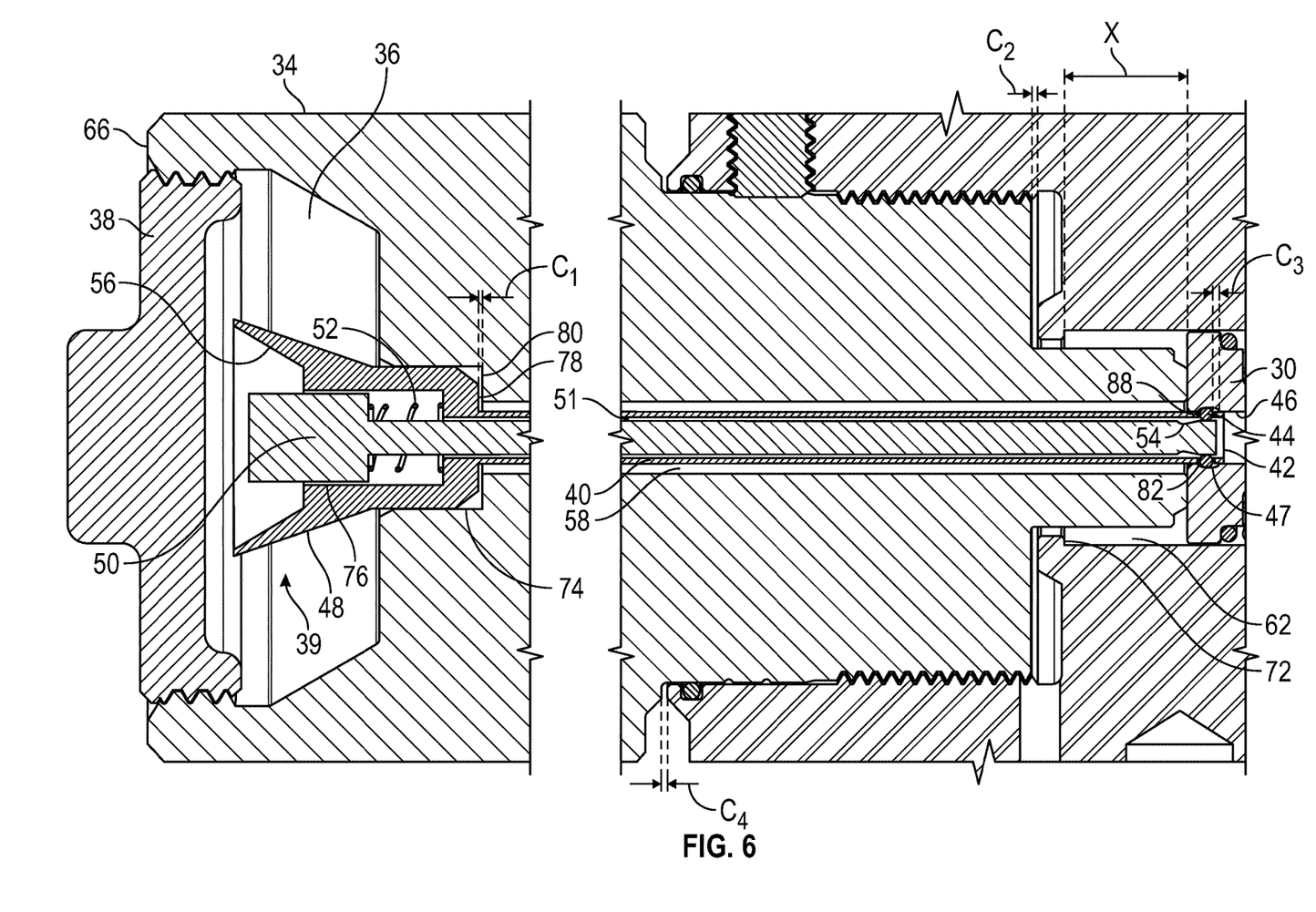
FIG. 6 is an enlarged schematic cross sectional side view of the exemplary bypass valve shown in FIG. 5.

FIG. 3 is a schematic partial cross sectional perspective front view of an exemplary bypass valve of the present invention. FIG. 4 is a schematic partial cross sectional perspective rear view of the exemplary bypass valve of FIG. 3. FIG. 5 is a schematic cross sectional side view of the exemplary bypass valve shown in FIG. 3. FIG. 6 is an enlarged schematic cross sectional side view of the exemplary bypass valve shown in FIG. 5.

A bypass valve 22 has a main valve body 24 with a proximal end 66 and a distal end 68 with at least one inlet/outlet port 26 that establishes a flow path. (For illustrative purposes and without limitation, a proximal position or direction is toward the left of the figures and a distal position or direction is toward the right of the figures.) The valve body 24 is formed with a valve body cavity 62 in which a dump cartridge 28 is slidably coupled to the valve body, such as from the distal end 68, until it butts against a stop shoulder 60. The dump cartridge 28 can be secured in position in the valve body cavity 62 by a fitting 64, such as an outlet adapter, coupled to the distal end of the valve body 24. The fitting 64 can be coupled to the dump cartridge 28 to extract the dump cartridge from the distal end 68 for replacement. The dump cartridge 28 includes a valve stem 30 that is biased toward the proximal end 66 with a valve stem bias member 70 to an open position that allows fluid to drain out of the valve through a drain port 32 that establishes a drain path. A shoulder 72 formed in the valve body stops the valve stem from further movement toward the proximal end 66.

An adjuster 34 is attached to the valve body 24, such as a handle threadably attached on the proximal end (although other adjustment devices are possible), and can be advanced distally in the valve body 24 toward the valve stem 30 to adjust the valve stem progressively to a closed position and anywhere therebetween by pushing against the bias on the valve stem. The movement of the valve stem 30 is limited proximally by the shoulder 72 and distally by the engagement of a taper 84 on the valve stem to a seat 86 on the dump cartridge 28 to establish a travel distance of "X" for the valve stem, as shown in the enlarged view of FIG. 5. The adjuster movement in the direction of the valve stem (against the bias) can throttle the amount of pumped fluid that flows out of the drain port 32 and thus the amount of fluid that flows out of the inlet/outlet port 26. When the dump cartridge 28 is completely closed by the adjuster movement, such as advancement, on the valve stem 30, there is little if any flow to the drain port, the system is at maximum pressure, and fluid flow can be discharged through one or more of the inlet/outlet ports 26 to one or more tool(s). If the load on the system is not a full amount of volume that can be produced, the valve can partially open to offload an excess amount of the volume while supplying the load volume at the intended pressure.

When the adjuster 34 is retracted in a direction away from the valve stem 30 in the dump cartridge 28, the valve stem is allowed to follow the position of the adjuster. The valve stem can follow the position of the adjuster either by the bias of the bias member 70 in the dump cartridge 28 pushing the valve stem 30 toward the adjuster 34, or by the direct action of fluid pressure in the dump cartridge pushing the valve stem against the adjuster.

If the bias member 70 or the fluid pressure is unable to automatically move the valve stem 30 to follow the position of the adjuster 34 in a customary manner when the adjuster is moved away (here, retracted) in a proximal direction away from the valve stem, then a retraction rod assembly 39 coupled between the adjuster 34 and the valve stem 30 can pull the valve stem toward the adjuster, so that the valve stem can remain in a default position adjacent the adjuster. In this embodiment, if the valve stem 30 is unable to automatically open and allow flow to the drain port 32 after the adjuster 34 is retracted, the retraction rod assembly 39 can pull the valve stem with the adjuster to the open (or partially open) position. While sufficient fluid pressure might eventually unseat a stuck valve stem 30, the pressure spike associated with such a stuck valve stem before unseating can cause system issues that could impact the operator and is desirably avoided.

In at least one embodiment, the retraction rod assembly 39 includes a retraction rod 40, a retainer 44 coupled to the retraction rod, and optionally a release member 50 slidably engaged with the retraction rod through a longitudinal release member bore 51 in the retraction rod and related elements described herein. The valve stem 30 can be formed with a valve stem cavity 46 on the proximal portion of the valve stem that is sized to accept a distal portion 42 of the retraction rod 40 when inserted therein. An engagement surface 47, such as a groove, can be formed around the perimeter of the valve stem cavity 46. The retainer 44 can be radially extendable and retractable at least partially through a wall of the retraction rod 40. A receiver 54 can be formed in the release member 50 near the retraction rod distal portion 42 to allow the retainer 44 to radially retract through the wall of the retraction rod 40 and at least partially into the receiver 54 to reduce an outer circumscribed effective perimeter of the retainer 44 to be dimensionally less than the wall perimeter of the valve stem cavity 46. The receiver 54 is sized and located on the release member 50, so that when the bias member 52 biases the release member 50 in a proximal direction, the shape of the rod 40 adjacent the receiver 54 pushes the retainer 44 radially outwardly through a corresponding opening in the retraction rod 40 and into the engagement surface 47 of the valve stem cavity 46. A bias member 52 can bias the release member 50 in a proximal direction, so that the retainer 44 is extended radially outward to engage the engagement surface 47 in the valve stem cavity 46 to releasably couple the retraction rod assembly 39 through the retraction rod 40 with the valve stem 30.

In at least one embodiment, a proximal portion 56 of the retraction rod 40 can be slidably coupled with the adjuster 34. The proximal portion 56 of the retraction rod 40 can include an enlarged portion, herein termed a release holder 48. A counterbore 74 can be formed in a proximal portion of the adjuster 34 to receive the release holder 48. The release holder 48 is sized to slide within the wall of the counterbore 74. Further, an adjuster bore 58 can be longitudinally formed through the adjuster 34, and the retraction rod 40 can be slidably coupled to the valve stem 30 therethrough. Further, the release holder 48 can also be formed with a counterbore 76 to receive a release member 50 generally near the proximal portion 56 of the retraction rod 40. The release member 50 is sized to slide within the wall of the counterbore 76 in the release holder 48 and allow a bias member 52 to be disposed between a proximal surface of the release holder 48 and a distal surface of the release member 50. The bias member 52 can bias the release member 50 proximally away from the release holder 48. The release holder 48 can assist an operator in grasping the proximal portion 56 of the retraction rod 40, while pressing the release member 50 against the bias in a distal direction.

In at least one embodiment, a default position for the release member 50 that is caused by the bias in an operation mode of the bypass valve is that the retainer 44 on the distal portion 42 of the retraction rod 40 can be engaged with the valve stem cavity 46, such as being engaged in the engagement surface 47. When the release member 50 is pressed in the distal direction toward the valve stem 30, the retainer 44 can be allowed to retract radially into the receiver 54 and release the retraction rod 40 from the valve stem cavity 46 in the valve stem 30.

Further, in at least one embodiment, the adjuster 34 can be formed with an adjuster cavity 36 to allow the retraction rod assembly 39 to be recessed within the adjuster. An adjuster cap 38 can be removably coupled with the adjuster 34 to cover the adjuster cavity 36 from debris and contamination. The adjuster cap 38 also serves as a check that the retraction rod 40 is sufficiently inserted into the valve stem cavity 46, or the adjuster cap will not correctly attach to the adjuster 34.

Clearances can be allowed in the combination of components described above. For example, a clearance C1 provides a space between the distal surface 78 of the release holder 48 and the proximal surface 80 of the adjuster counterbore 74. If the valve stem 30 is able to move when the adjuster is moved in a proximal direction away from the valve stem, then pulling on the valve stem by the retraction rod assembly 39 via the retainer 44 on a proximal portion 82 of the engagement surface 47 of the valve stem cavity 46 is not needed and generally does not occur with the C1 clearance. Stated differently, a distance between the distal surface 78 of the release holder 48 to a proximal portion 88 of the retainer 44 that can engage the proximal portion 82 of the engagement surface 47 is greater than a distance between the proximal surface 80 of the adjuster counterbore 74 to the proximal portion 88 of the retainer 44. Clearances C2 and C4 allow spaces for the adjuster 34 to fully close the valve stem 30 to a closed position. Clearance C3 allows a space to insure under normal manufacturing conditions that the retainer 44 can sufficiently engage the engagement surface 47.

In more detail in this exemplary embodiment, to mate with the valve stem cavity as shown in FIGS. 5 and 6, the release member 50 can be pushed distally against the bias member 52 to align the receiver 54 with the retainer 44 that is radially extended at least partially into the wall of the retainer rod 40. The aligned receiver 54 allows the retainer 44 to retract at least partially through the retraction rod 40 into the receiver 54 to be dimensionally sized less than the wall of the valve stem cavity 46. The retraction rod 40 can be inserted into the valve stem cavity 36 and the release member 50 released. The bias member 52 causes the release member 50 with the receiver 54 to move proximally and the shape of the retraction rod adjacent the receiver 54 pushes the retainer 44 radially outward at least partially through the wall of the retraction rod 40 to engage with the engagement surface 47 of the valve stem cavity 46. When radially extended, the retainer 44 can longitudinally retain the retraction rod assembly 39 through the retraction rod 40 with the valve stem cavity 46.

To release the retraction rod assembly 39 from the valve stem cavity 46 in the valve stem 30, the release member 50 can be again be moved in a distal direction against the bias member 52 to allow the retainer 44 to be radially retracted at least partially through the wall of the retraction rod 40 and into the receiver 54 to disengage the retainer 44 from the engagement surface 47. While disengaged, the retraction rod 40 can be separated longitudinally from the valve stem cavity 46. The retraction rod assembly 39 can be pulled out of the adjuster 34, if desired.

Figure 7:
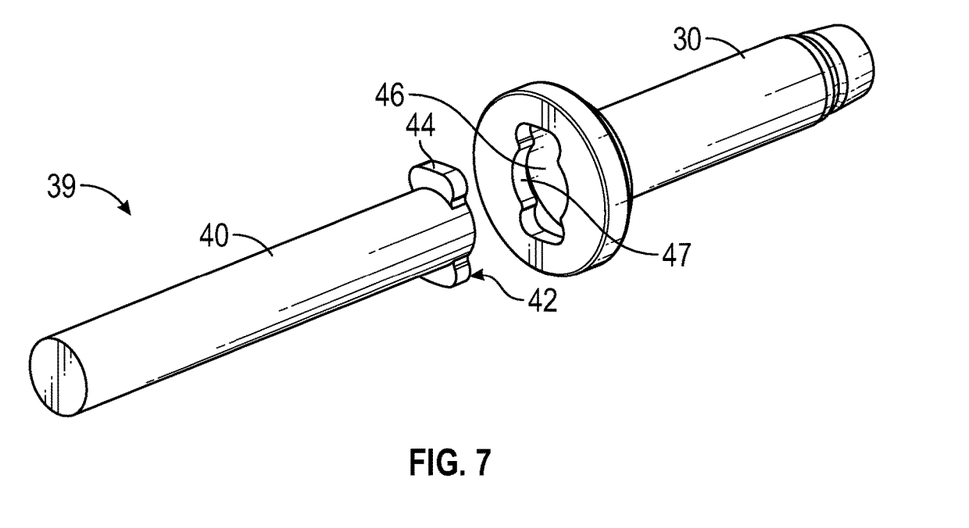
FIG. 7 is a schematic perspective view of an alternative embodiment of the retraction rod distal portion and the proximal portion of the valve stem.
Figure 8:
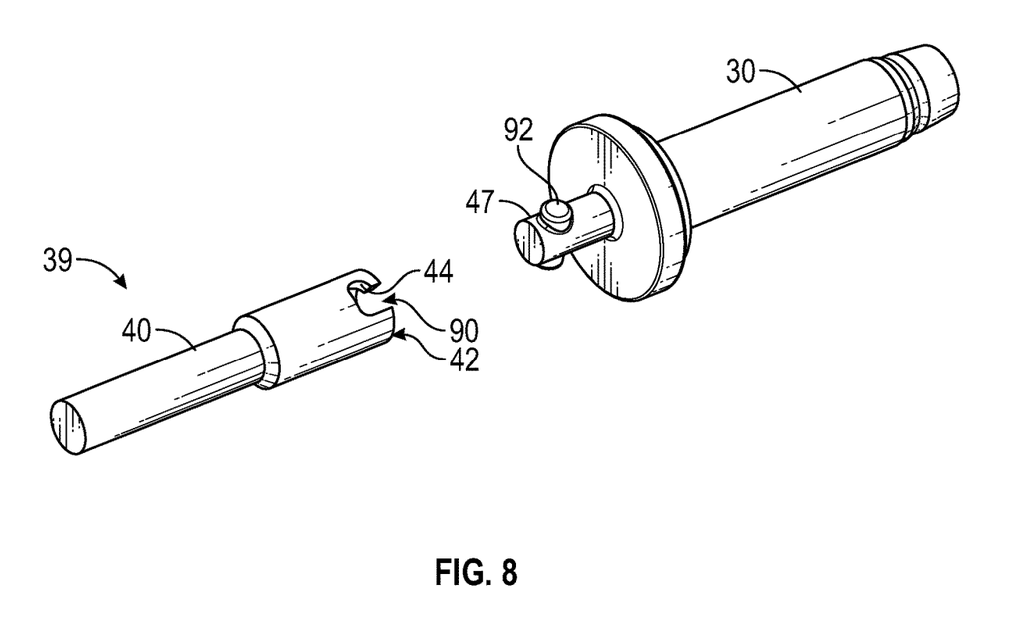
FIG. 8 is a schematic perspective view of another alternative embodiment of the retraction rod distal portion and the proximal portion of the valve stem.

Various embodiments of the different components described above are contemplated and possible. For example, the interface between the retraction rod assembly 39 and the valve stem 30 to form a positive coupling for retraction can vary. FIGS. 7 and 8 illustrate two of many variations as examples and without limitation.

FIG. 7 is a schematic perspective view of an alternative embodiment of the retraction rod distal portion and the proximal portion of the valve stem. The retraction rod assembly 39 at a distal portion 42 of the retraction rod 40 can include a retainer 44 that extends radially outward. The valve stem 30 can be formed with a valve stem cavity 46 to allow insertion of the distal portion 42 and the retainer 44 therein. An engagement surface 47 can be formed in the valve stem 30 such as in the valve stem cavity 46. In this embodiment, the valve stem cavity 46 in conjunction with the engagement surface 47 allows the rod distal portion 42 and the retainer 44 to be inserted when rotationally aligned to pass beside the engagement surface 47. Once the retainer 44 has been inserted to a depth in the cavity to clear the engagement surface 47, the retraction rod 40 can be rotated by an angle, so that the retainer 44 is behind (that is distal to) the engagement surface 47, so that the retraction rod assembly 39 through the retraction rod 40 can pull the valve stem proximally if needed. By rotation to a different angle to clear the retainer 44 from the engagement surface 47, the retraction rod assembly 39 with the rod 40 can be released from the valve stem cavity 46.

FIG. 8 is a schematic perspective view of another alternative embodiment of the retraction rod distal portion and the proximal portion of the valve stem. This embodiment illustrates similar principles of the interface between the retraction rod assembly 39 and the valve stem 30 as in FIG. 7, but with the engagement configurations reversed. More specifically, the retraction rod 40 of the retraction rod assembly 39 can be formed with a rod cavity 90 at the rod distal portion 42. A retainer 44, such as shaped as an "I" slot or "J" slot, can be formed in the wall of the cavity 90. The valve stem 30 can be formed with an engagement surface 47 on a proximal portion of valve stem. The engagement surface 47 can extend proximally and be sized to fit inside the rod cavity 90 except for one or more protrusions 92. Protrusions 92 can extend radially outward and be sized to engage the retainer 44 in the slotted retainer 44 of the retraction rod 40.

To couple the rod 40 with the valve stem 30, the rod distal portion 42 with the retainer 44 can be rotationally aligned and moved distally, so that the engagement surface 47 slides into the rod cavity 44 and the protrusions 92 are aligned to pass into the retainer 44. The rod 40 can be rotated to "hook" the protrusions in the retainer 44, so the retraction rod assembly 39 through the retraction rod 40 can pull the valve stem proximally if needed. By rotation in the opposite direction, the retraction rod 40 can be released from the engagement surface 47.

Other and further embodiments utilizing one or more aspects of the inventions described above can be devised without departing from the disclosed invention as defined in the claims. For example, the release and retraction elements and mechanisms can vary, along with other variations can occur in keeping within the scope of the claims. In at least one alternative embodiment, the retraction rod assembly 39 can be coupled with the valve stem 30 on the dump cartridge 28, and the dump cartridge and retraction rod assembly can be inserted into the valve cavity 62. The retraction rod assembly 39 can be inserted through the adjuster bore 58 and fastened on a proximal portion of the adjuster 34 with appropriate tension and clearance. Other embodiments have been contemplated.

The invention has been described in the context of preferred and other embodiments and not every embodiment of the invention has been described. Obvious modifications and alterations to the described embodiments are available to those of ordinary skill in the art. The disclosed and undisclosed embodiments are not intended to limit or restrict the scope or applicability of the invention conceived of by the Applicant, but rather, in conformity with the patent laws, Applicant intends to protect fully all such modifications and improvements that come within the scope or range of equivalents of the following claims.

What is claimed is:

1. A positive retraction bypass valve, comprising:
   a valve body having a proximal end and a distal end and having a flow path, a drain path, and a valve body cavity formed in the valve body and fluidicly coupled to the flow path and the drain path;
   a dump cartridge having a slidable valve stem, the dump cartridge being disposed in the valve body cavity;
   a bias member configured to bias the slidable valve stem in the dump cartridge to allow flow through the drain path;
   an adjuster adjustably coupled to the valve body and configured to push the valve stem toward a closed position to progressively restrict flow through the drain path; and
   a retraction rod releasably coupled to (i) the adjuster on a proximal portion of the rod, (ii) the valve stem on a distal portion of the rod, or (iii) a combination thereof; the rod being configured to pull the valve stem toward the adjuster if the valve stem does not follow the position of the adjuster when the adjuster is moved in the direction away from the valve stem.

2. The valve of claim 1, wherein:
   the dump cartridge is slidably disposed in the valve body cavity from the distal end, and the valve stem is biased toward the proximal end;
   the adjuster is coupled to the valve body on the proximal end to push the valve stem toward the distal end; and
   the retraction rod is coupled between the adjuster and the valve stem to pull the valve stem toward the proximal end if the valve stem does not follow the position of the adjuster when the adjuster is moved in direction toward the proximal end.

3. The valve of claim 1, wherein the adjuster is formed with a bore therethrough and configured to allow the retraction rod to pass through the bore and further comprising a release member slidably coupled to the rod on a proximal side of the adjuster and distal from the dump cartridge relative to the adjuster, the release member configured to release the rod from the valve stem.

4. The valve of claim 1, wherein the valve stem comprises a valve cavity formed in the proximal end of the valve stem and the retraction rod is releasably coupled to the valve stem in the valve cavity.

5. The valve of claim 4, wherein the valve stem comprises an internal engagement surface around the periphery of the valve cavity and the releasable rod further comprises a retainer extendable from the rod and configured to engage the engagement surface to releasably couple the rod with the valve stem.

6. The valve of claim 1, wherein the valve stem comprises an engagement surface formed in the proximal end of the valve stem and the retraction rod comprises a retainer formed in a distal portion of the rod, and the retraction rod is configured to be releasably coupled with the valve stem by the engagement surface and the retainer.

7. The valve of claim 1,
   wherein the valve body cavity forms a shoulder and the dump cartridge abuts the shoulder to restrict further movement in the direction of the shoulder, and
   wherein the valve stem is biased in the direction of the shoulder.

8. A method of operating a bypass valve, the bypass valve formed with a flow path and a drain path, and having a valve body with a dump cartridge disposed therein, the dump cartridge having a valve stem that is biased with a bias member, and an adjuster coupled to the valve body with a retraction rod coupled between the adjuster and the valve stem, the method comprising:
   adjusting a fluid flow through the flow path of the valve by moving a position of the adjuster in a direction toward the valve stem to change a flow through the drain path;
   moving the adjuster in a direction away from the valve stem;
   allowing the valve stem to follow the position of the adjuster by a bias of the bias member when the adjuster is moved in the direction away from the valve stem; and
   pulling the valve stem with the retraction rod, if the valve stem does not follow the position of the adjuster when the adjuster is moved in the direction away from the valve stem.

9. The method of claim 8, further comprising selectively releasing the retraction rod from; (i) the adjuster, (ii) the valve stem, or (iii) a combination thereof.

10. The method of claim 8, further comprising allowing the adjuster to move in the direction away from the valve stem by a distance prior to pulling the valve stem with the retraction rod, if the valve stem does not follow the position of the adjuster.

* * * * *